Nov. 25, 1924.
J. L. BURNS
1,516,953
EQUALIZER
Filed Jan. 9, 1923
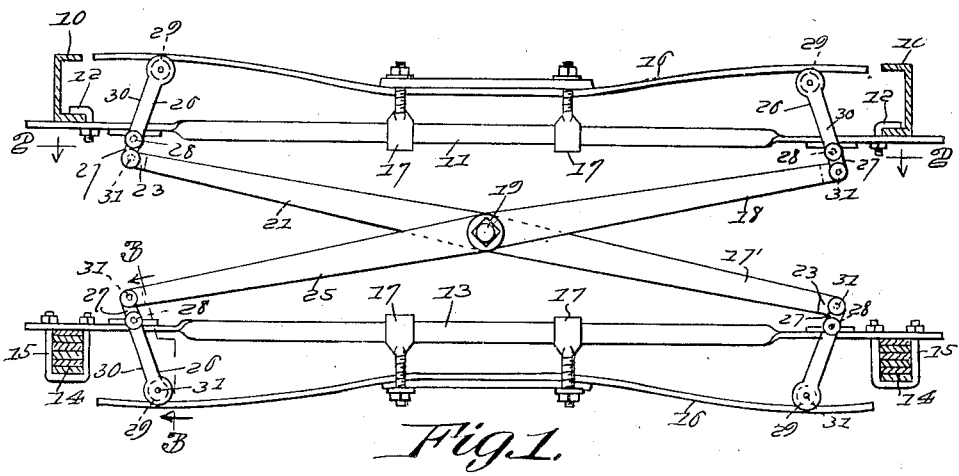
Fig. 1.
Fig. 2.
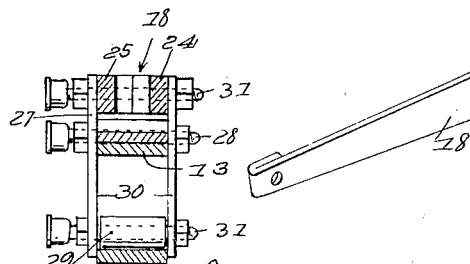
Fig. 3.
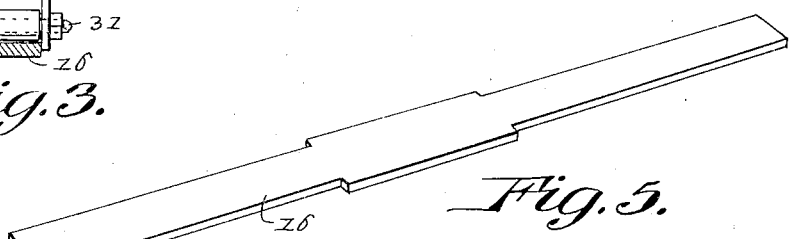
Fig. 4.
Fig. 5.
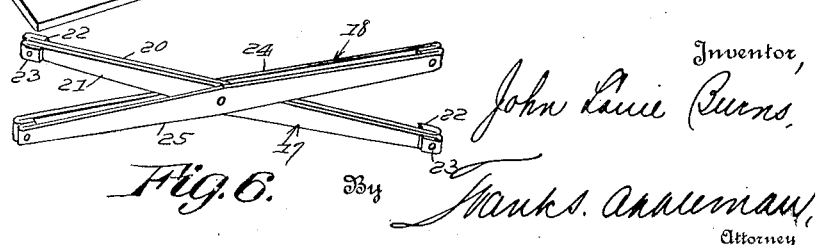
Fig. 6.
Inventor,
John Laurie Burns,
By Franks. Anderman,
Attorney Patented Nov. 25, 1924.

1,516,953

UNITED STATES PATENT OFFICE.

JOHN LOUIE BURNS, OF WICHITA FALLS, TEXAS.

EQUALIZER.

Application filed January 9, 1923. Serial No. 611,627.

*To all whom it may concern:*

Be it known that I, JOHN LOUIE BURNS, a citizen of the United States of America, and resident of Wichita Falls, in the county of Wichita and State of Texas, have invented certain new and useful Improvements in Equalizers, of which the following is a specification.

This invention relates to equalizers for spring vehicles and has for an object the provision of novel means for resiliently maintaining the spring supporting element such as the chassis frame of an automobile with relation to the axle or springs thereof.

While the invention is primarily adapted for use in automobile construction, it is likewise capable of use in connection with a horse drawn vehicle, but in the description to follow, the invention will be referred to as associated with parts of an automobile.

It is a further object of this invention to provide means whereby the device can be mounted on the chassis frame and in operative relation to the springs of an automobile, thus making it possible to install the device on automobiles now in common use whereby the weight is equalized on the side springs and undue rebounding of the frame with relation to the axle is prevented.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a device embodying the invention, showing fragments of the automobile frame and springs in section;

Figure 2 illustrates a plan view of one element of the equalizer;

Figure 3 illustrates a sectional view on the line 3—3 of Fig. 1;

Figure 4 illustrates a perspective view of one of the lever elements;

Figure 5 illustrates a perspective view showing the type of spring employed in the device; and Figure 6 is a perspective view of the two lever elements.

In these drawings, 10 denotes the side elements of a chassis frame to which a bar 11 may be secured in any appropriate manner as by riveting or the like, but clamps 12 are shown for use in attaching the bar to the said chassis frame. A bar 13 is also employed and it is connected to the springs 14 by clips 15.

Each bar has a spring 16 connected to it by the stirrups 17 and the springs extend approximately parallel with the bars, although they are distorted somewhat as they yield in their operation.

Crossed levers 17' and 18 are connected at their centers by a pivot 19 on which the levers are oscillatable, and preferably, these levers comprise two parallel members of identical construction, but they are differently assembled, as will presently appear. The members 20 and 21 of the levers 17 have their ends outwardly turned as shown at 22 and 23 and the said members are in engagement with each other throughout their lengths and they are located between the members 24 and 25 of the lever 18. The members 24 and 25 have their ends inwardly folded or bent and the inturned portions of these members engage each other and the members themselves are therefore held in spaced relation to each other to produce a clearance for the lever 17.

Each lever has its end pivotally connected to a shackle 26 and the shackles are pivotally mounted on the bars 11 and 13, as fully shown in the drawing. Suitable clips 27 may be secured to the bars for holding the pivots 28 on which the shackles are oscillatably mounted, and the shackles are of such length as to operate in conjunction with the inner surfaces of the springs 16. An anti-friction roller 29 is rotatably mounted at the end of each shackle and these rollers operate over the springs to reduce wear of the parts.

As shown in the drawing, each shackle comprises in part two side elements 30 and shackle bolts are employed as shown at 31, and these are employed in addition to the pivots 28 on which the shackles are oscillatable.

From an inspection of the drawing, it will be apparent that the movement of the levers in action when their ends approach one another communicate oscillatory motion to the shackles and they in turn bear against the springs 16 with which they cooperate.

I claim:

1. In a spring equalizer, a bar connected to the springs of a vehicle, a bar connected to the frame, shackles oscillatably mounted on the said bars, crossed levers each having one of its ends connected to the shackle on one bar and to the shackle on the other bar on opposite sides of the vehicle, means for pivotally connecting the levers together, and springs engaging the end of the shackle remote from the pivot and exerting pressure on the shackles, as and for the purpose described.

2. In a spring equalizer, a bar connecting the springs on two sides of an automobile, a bar anchored to the side members of the frame of an automobile, shackles pivotally connected to the bars near their ends, springs engaging the ends of the shackles remote from their pivots, and crossed levers pivotally connected together and having their ends pivotally connected to the shackles of respective bars on opposite sides of the pivot of the levers.

3. In a spring equalizer, bars one of which is connected to the springs of an automobile and the other of which is connected to the load supporting elements thereof, shackles pivotally mounted at the ends of the bars and having projections on two sides of the axes of their mountings, springs extending approximately parallel with the bars on which the shackles are pivoted, including means connected to the bars for holding the springs, said springs engaging the projections of the shackles on one side of the axes of the pivots, and pivotally connected crossed levers having their ends pivotally connected to the projections of the shackles on the opposite sides of the said axes of the pivots.

JOHN LOUIE BURNS.